United States Patent [19]
James

[11] 3,870,034
[45] Mar. 11, 1975

[54] PERSONAL GALVANIC SKIN RESPONSE MONITORING INSTRUMENT

[75] Inventor: J. Michael James, Cambridge, Mass.
[73] Assignee: Cyborg Corporation, Boston, Mass.
[22] Filed: Mar. 26, 1973
[21] Appl. No.: 345,463

[52] U.S. Cl.............................. 128/2.1 Z, 324/62 R
[51] Int. Cl................................................ A61b 5/05
[58] Field of Search........... 128/2.1 R, 2.1 Z, 2.1 E, 128/2.06 R, 2.05 P, 418; 35/22; 273/1 E; 324/62 R

[56] References Cited
UNITED STATES PATENTS

| | | | |
|---|---|---|---|
| 2,799,269 | 7/1957 | Mathison | 128/2.1 Z |
| 3,025,858 | 3/1962 | Browner | 128/418 |
| 3,052,233 | 9/1962 | Veling | 128/418 X |
| 3,207,151 | 9/1965 | Takagi | 128/2.1 R |
| 3,283,244 | 11/1966 | Proctor | 324/62 R |
| 3,530,855 | 9/1970 | Balding | 128/2.1 R |
| 3,614,651 | 10/1971 | Pasquier | 128/2.1 R X |
| 3,648,686 | 3/1972 | Payne | 128/2.1 Z |
| 3,730,173 | 5/1973 | Deaton | 128/2.1 Z |
| T912,010 | 7/1973 | Holsinger | 128/2.06 R |

OTHER PUBLICATIONS
Mount, "Electrical Impedance Instrument," J. Assn. for Adv. of Med. Inst., V. 6, No. 2 March–April 1972, p. 180.

Primary Examiner—Richard A. Gaudet
Assistant Examiner—Lee S. Cohen
Attorney, Agent, or Firm—Morse, Altman, Oates & Bello

[57] ABSTRACT

A device adapted to be worn on the wrist is provided for conveniently measuring the galvanic skin response of the wearer as a means for monitoring the activity of an individual's nervous system. The instrument includes a case provided with straps or the like for wear upon the wrist much like a wrist watch and houses an oscillator circuit, a battery, a sound emitting device and a pair of spaced electrodes located on opposite ends of the casing so that the wearer may conveniently touch the two electrodes with two fingers. The skin resistance is thereby measured and converted into a variable pitch audible signal and/or a flashing light as an indication of the individual's tension level.

6 Claims, 5 Drawing Figures

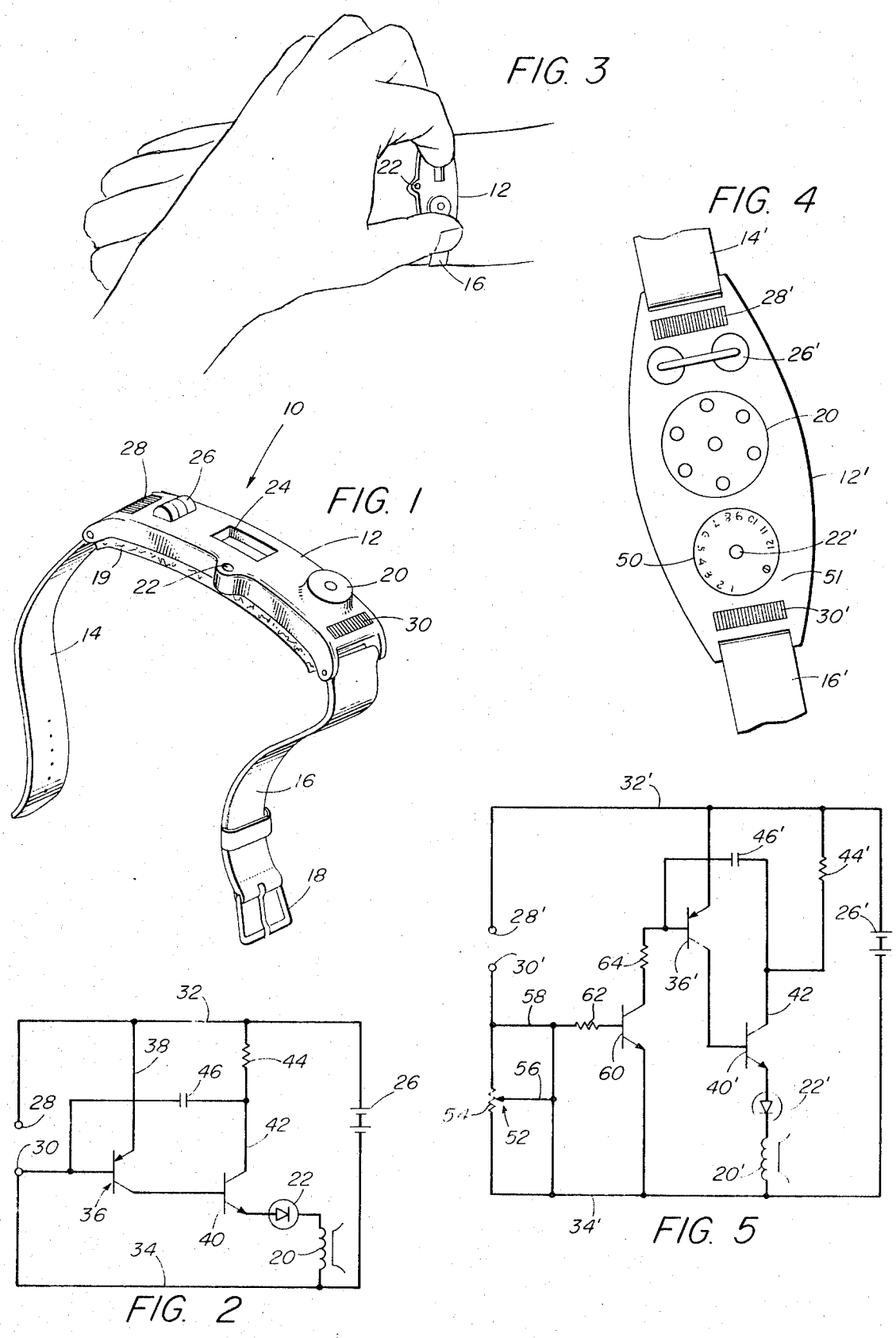

PERSONAL GALVANIC SKIN RESPONSE MONITORING INSTRUMENT

BACKGROUND OF THE INVENTION

1. Field of the Invention

This invention relates generally to biofeedback instruments and more particularly is directed towards a personal wrist worn device for conveniently measuring the galvanic skin resistance of the wearer as an indication of autonomic nervous system activity.

2. Description of the Prior Art

It is known that the electrical resistance in the skin of humans varies as a function of autonomic nervous system activity. The change in skin resistance occurs as a result of autonomic activity which has been demonstrated to be generalized and not merely of local character. A subject who has been exposed to a stressful situation will display a sudden drop in resistance between two areas of the skin. A measurement of this change in skin resistance is useful not only in research but also to provide a physician, or the subject himself, with an indication of stress levels.

While various types of instruments have been developed heretofore to measure changes in skin resistance, such instruments have been rather large, cumbersome and complex suitable for laboratory use and requiring various adjustments and the fitting of electrodes to the skin. Such equipment is not adapted to be carried about or worn on the person so that an individual may monitor his own stress levels at any given time.

Accordingly, it is an object of the present invention to provide a personal psychogalvanometer easily worn on the wrist of an individual and adapted to provide an output response by the act on the part of the subject of merely touching two spaced electrodes on a wrist-worn casing. Another object of this invention is to provide a small, compact galvanic skin response monitoring instrument worn on the wrist and adapted in one mode to measure sudden changes in skin resistance or in another mode to monitor galvanic skin resistance changes accruing over relatively long periods of time.

SUMMARY OF THE INVENTION

This invention features a personal galvanic skin response monitoring instrument comprising a small casing having straps for attaching the casing to the wrist of a subject. A miniaturized oscillator circuit is disposed in the casing and is energized by small batteries also mounted to the casing. The oscillator circuit is connected to a sound-emitting device such as a small speaker in series with a light emitting diode. The circuit includes a pair of exposed contacts spaced at opposite ends of the casing and adapted to be touched as by the thumb and middle finger of the wearer to close the circuit. The skin resistance of the subject monitored by the circuit controls the frequency of the oscillator and thereby varies the audio output rate of the speaker as well as the flashing rate of the light emitting diode. In a modification of the invention a pre-amplifier stage is provided between one of the contacts and the oscillating circuit to increase sensitivity and response.

BRIEF DESCRIPTION OF THE DRAWINGS

FIG. 1 is a view in perspective of a monitoring instrument made according to the invention, FIG. 2 is a diagram of the circuit employed in the FIG. 1 instrument, FIG. 3 is a view in perspective illustrating the use of the instrument, FIG. 4 is a fragmentary top plan view of a modification of the invention, and, FIG. 5 is a diagram of the circuit employed in the FIG. 4 embodiment.

DETAILED DESCRIPTION OF THE PREFERRED EMBODIMENTS

Referring now to the drawings and to FIGS. 1, 2 and 3 in particular, the reference character 10 generally indicates a personal galvanic skin response monitoring instrument made according to the invention and organized about a casing 12 on the order of 2 inches in length and 1 inch in width. The dimensions are not critical and the configuration may be varied as desired. However, the overall size of the casing should be small enough to be worn easily on the wrist of the wearer and typically should correspond generally to size and shape of a wrist watch. The casing 12 may be slightly contoured to conform to the curvature of the wrist and each end is provided with bands 14 and 16 having a buckle 18 by which the casing may be strapped onto the wrist of an individual. An expansion bracelet or the like may also be employed and a cushion backing 19 of sponge, for example, may cover the inner face of the casing.

In the FIG. 1 embodiment, the casing 12 includes a sound-emitting device 20 such as an earphone speaker equipped with a metal plate or disc adapted to vibrate when energized to produce a series of clicks the rate of which varies with changes in the skin resistance of the individual. The casing is also provided with a light source 22, preferably in the form of a light emitting diode (LED) which is in series with the speaker 20 and is adapted to flash in synchronism with the speaker 20. The casing is formed with a recess 24 containing the electronic components and circuitry. The casing also includes a replaceable power source such as a small silver oxide battery 26 or the like. The batteries may be conveniently mounted in a recess formed in the casing and secured by spring-loaded contacts or other means.

Mounted in spaced relation to the exterior of the casing and preferably at opposite ends thereof are two contacts 28 and 30 in position for the wearer to touch as with his thumb and middle or forefinger, as suggested in FIG. 3. The contacts 28 and 30 preferably are of a size and shape as to be fully covered by an average finger-tip and conveniently may be flush with the surface of the casing.

Referring now more particularly to FIG. 2, the circuit for the FIG. 1 instrument will be described in detail. The circuit includes a pair of leads 32 and 34 connected, respectively, to the contacts 28 and 30 and to opposite poles of the battery 26. The circuit also includes a PNP transistor 36 the base of which is connected to the contact 30 with the emitter connected by a lead 38 to the lead 32. The collector of the transistor 36 is connected to the base of an NPN transistor 40 the emitter of which is in series with the light emitting diode 22 and the coil of the speaker 20 which, in turn, is connected to the lead 34. The collector of the transistor 40 is connected by a lead 42 through a resistor 44 to the lead 32. A capacitor 46 is connected between the base lead of the transistor 36 to the collector lead 42 of the transistor 40 to form an oscillating circuit. Typical values for the components include a battery on the order of 1.5 volts, a resistor of 33 ohms and a capacitor of 4 mf.

When the individual touches the two contacts 28 and 30 in the manner suggested in FIG. 3, the circuit will be closed and, in effect, a resistance represented by the skin resistance of the individual, is inserted between the contacts 28 and 30. This resistance will provide biasing voltage to the base of the transistor 36, the voltage being the function of the level of skin resistance in the individual. In any event, the voltage thus applied to the transistor 36, will, in turn, provide amplified current to the base of the transistor 40 and together with the capacitor 46 an oscillating action is developed to drive the LED 22 and the speaker 20 at a rate related to the skin resistance of the individual. The foregoing circuit is characterized by relatively low response and is used for monitoring basal skin resistance of the individual wearing the device over a relatively long period of time.

In order to provide greater sensitivity and thus measure sudden changes in skin resistance of an individual, a pre-amplifying stage may be provided as shown in the modification of FIGS. 4 and 5. In this embodiment, a casing 12' is provided similar to the casing of the principal embodiment and equipped with straps 14' and 16' or other connecting means such as an expansion bracelet by which the device may be worn on the wrist. In addition to the foregoing components, the modified device of FIG. 4 also includes a movable dial 50 bearing numbered settings typically from 1 to 12 adapted to be set opposite a fixed reference mark 51. The dial 50 is operatively connected to a potentiometer 52 as appears in the circuit diagram of FIG. 5. In the FIG. 5 diagram, the oscillating circuit corresponds with the oscillator circuit of the FIG. 2 embodiment including transistors 36' and 40' connected in the same fashion with a capacitor 46' connected between the base of the transistor 36' and the collector of the transistor 40'. A resistor 44' completes the oscillating circuit. In this embodiment, however, a pre-amplifier stage is provided between the contact 30' and the base of the transistor 36'. The pre-amplifier stage includes the poteniometer 52 comprised of a resistor portion 54 in the lead 34' and a movable contact 56 connected between the lead 34' and a lead 58 which connects the contact 30' to the base of a PNP transistor 60 such as a 2N5089 transistor. A resistor 62 of perhaps 1K is connected between the collector of the transistor 60 and the base of the transistor 36'. The emitter of the transistor 60 is connected to the lead 34'. In the FIG. 5 circuit the capacitor 46' typically has a capacitance of 1mf, the resistor 44' is at 33 ohms and the battery 26' is 1.5 volts, typically a silver oxide battery. The transistors in the oscillating circuit may be a 2N5138 for the transistor 36' while a 2N3393 is used for the transistor 40'. The speaker 20' preferably is a cone speaker with a wide dynamic range providing a changing continuous tone rather than a series of clicks. The base resistor 62 typically is of 10K value while the poteniometer which forms part of a balancing bridge circuit is adjustable from 500 K ohms.

The foregoing circuit is extremely sensitive and is capable of measuring very slight changes in skin resistance. A small change in resistance of the individual's skin will result in a large change in the rate of oscillation of the oscillating circuit, thereby altering the frequency of the speaker output and the flasing rate of the LED 22'. The poteniometer 52 is employed to balance the bridge circuit formed by the skin resistance across the contacts and the other portions of the circuit. In practice, the poteniometer 52 is set by the wearer at the operating point of the transistor 60 and, once it has been set, the individual may determine his own basal skin response any time by merely touching the two contacts as suggested in FIG. 3. The device of the modification is characterized by an extremely fast response and quickly measures sudden changes in skin resistance. Under relaxed conditions, the skin resistance of an individual is normally high whereas the skin resistance lowers as the subject becomes tense. The changes in skin resistance thus reflect the activity of the individual's nervous system.

The foregoing device is small and light and may be worn on the wrist much like a wrist watch so that an individual may at any time determine his autonomic nervous system activity. This knowledge may be used to avoid or control wide changes in nervous system activity or may be employed as a research instrument, as a lie-detector, a bio-feedback device or the like.

While the invention has been described with particular reference to the illustrated embodiments, it will be understood that numerous modifications will appear to those skilled in the art. For example, instead of the speaker and flashing light output or in addition thereto, a digital display can be provided to numerically display the oscillation rate. Also, in the FIG. 5 circuit a by-pass switch may be added to permit the pre-amplifier stage to be switched on or off and thus provide two operating modes.

Having thus described the invention what I claim and desire to obtain by Letters Patent of the United States is:

1. A device for indicating changes in electrical resistance in the skin of a human subject, comprising
   a. a casing of a size and shape adapted to be worn on a wrist of said subject and having an inner and an outer face,
   b. wrist band means connected to said casing for detachably engaging the inner face of said casing to said wrist,
   c. a pair of exposed electrodes mounted in fixed spaced relation to the outer face of said casing and adapted to be touched by two different fingers of said subject, said electrodes being substantially flush with the outer face of said casing and of a size and shape to be covered by an average fingertip
   d. a source of electrical power mounted to said casing and connected to said electrodes for establishing a potential difference between said electrodes,
   e. first means responsive to the current flowing between the electrodes for deriving a signal related to the skin resistance of said subject,
   f. a variable frequency oscillator mounted to said casing,
   g. second means responsive to the derived signal for controlling the frequency of said oscillator whereby the frequency of said oscillator will vary with changes in the skin resistance of said subject, and,
   h. third means coupled to said oscillator for indicating changes in oscillator frequency.

2. A device according to claim 1 wherein said third means includes sound generating means.

3. A device according to claim 1 wherein said third means includes light producing means.

4. A device according to claim 3 wherein said light producing means is a light emitting diode.

5. A device according to claim 1 including a high gain pre-amplifier connected between said oscillator and one of said electrodes.

6. A device according to claim 5 wherein said pre-amplifier includes a potentiometer and control means mounted to said casing for adjusting said potentiometer.

* * * * *